Aug. 8, 1967            A. HARTAI            3,335,424

RECORDER INK SUPPLY SYSTEM

Filed Oct. 21, 1965

INVENTOR.
ANTAL HARTAI
BY Charles A. Weigel
ATTORNEY

United States Patent Office 3,335,424
Patented Aug. 8, 1967

3,335,424
RECORDER INK SUPPLY SYSTEM
Antal Hartai, Littleton, Mass., assignor to Hewlett-Packard Company, Palo Alto, Calif., a corporation of California
Filed Oct. 21, 1965, Ser. No. 500,092
14 Claims. (Cl. 346—140)

ABSTRACT OF THE DISCLOSURE

An ink recorder is provided with an automatic actuating valve and pump in the line between the ink reservoir and pen tip to improve the quality of the ink trace.

---

Figure 1:
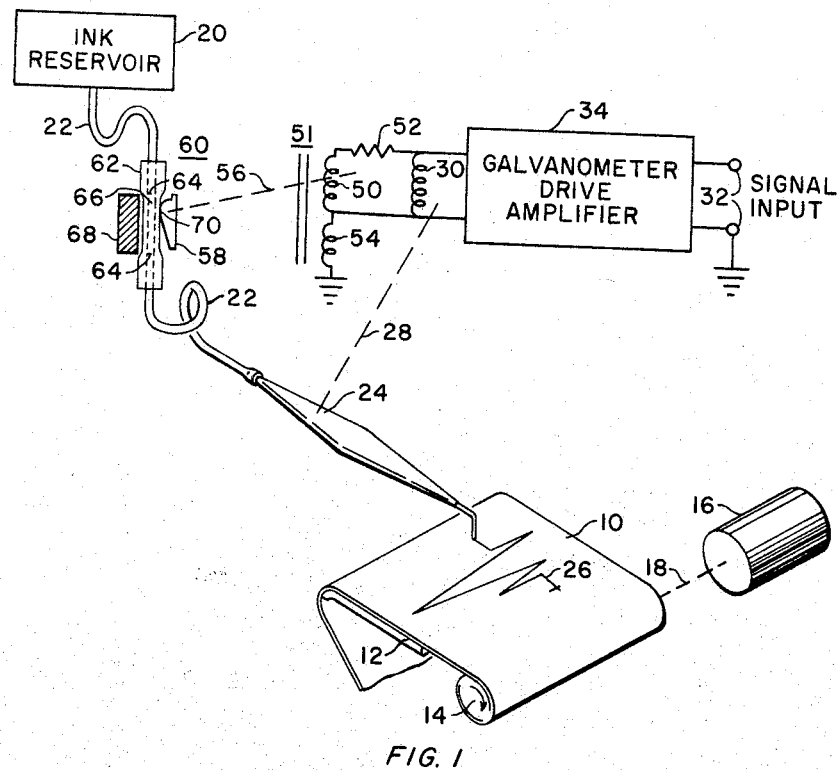

This invention relates to an ink supply system for graphic recorders and, more particularly, to an improved inking system for use with high-speed oscillographic recorders, which system reduces skipping and flooding of the ink pen on the chart paper.

Some of the early graphic recorders used inking systems which were dependent upon either gravity or capillary action to supply ink from a reservoir to the nib of an ink pen. While satisfactory for low-speed pen movements, such systems have been entirely unsatisfactory with the newer high-speed oscillographic type recorders where signals having rise times in the millisecond range are recorded. When a pen is driven to record these high frequency signals, not only its velocity but also its acceleration is considerable. With such high velocity and acceleration, the pen tends to skip, producing blanks or discontinuities in the ink trace. In addition, the width of the ink trace tends to vary inversely with pen speed relative to the chart paper. Such width variations are undesirable to say the least.

These effects can be overcome to some extent by using a higher static ink pressure but, unfortunately, when signals having a lower rise time or frequency are recorded, the pen tip tends to flood and literally causes puddles on the chart paper and the width variations are still present to some extent.

One system that has been employed to avoid pen skipping, or alternatively flooding, has been that described in Reissue Patent No. 25,692 issued to A. D. Brown, Jr. on Dec. 1, 1964. The Brown patent teaches the use of a highly viscous ink which is under a high static ink pressure to prevent skipping. Unfortunately, in this system the ink pen nib or tip must be pressed against the chart paper with a greater force to prevent leakage. This increases the friction between the pen tip and the chart paper which not only reduces the lifetime of the pen tip but also slows down the pen's response time and increases the over-all hysteresis of the system. Higher driving power is required to obtain an acceptable response time which makes for a more expensive system.

It is, therefore, an object of this invention to obviate many of the disadvantages inherent in the prior art inking systems.

Another object of this invention is to record relatively high frequency signals using a direct writing ink pen.

Still another object of this invention is to provide an improved ink feed system for a graphic recording system which reduces pen skipping and flooding.

These and other objects of the invention are accomplished in one form of the invention with the addition of a novel ink valving-pump to an otherwise conventional oscillographic type, graphic recording system. The valving-pump is interposed in the conduit between the ink reservoir and the pen of the recording system. The valving-pump performs two functions; firstly, it closes the conduit so that the ink cannot flow away from the pen tip due to acceleration or deceleration forces acting on the ink in the pen. Simultaneously with the closing of the conduit, a flexible section in the conduit is squeezed so as to increase the pressure of the ink available to the pen tip and thereby provide an ample supply of ink under relatively high-speed writing conditions.

In accordance with a preferred embodiment of the invention the valving-pump is driven by an electromechanical actuator having a pull-in and a hold winding. The pull-in winding responds to input signals having a rapid rise or fall time and the hold winding insures continuous pressure on the ink for a period of time necessary to permit the pen velocity to drop in the absence of a further change in amplitude of the input signal.

Figure 2:
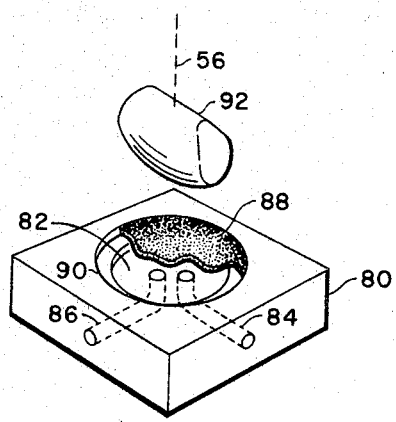

The novel features that are considered characteristic of this invention are set forth with particularity in the appended claims. The invention, itself, however, both as to its organization and method of operation, as well as additional objects and advantages thereof, will best be understood from the following description when read in connection with the accompanying drawings, in which:

FIGURE 1 is a partial schematic and partial pictorial view of a graphic recording system constructed in accordance with one embodiment of this invention; and FIGURE 2 is an alternative valving-pump arrangement that may be employed in the system illustrated in FIG. 1.

In the drawing of FIG. 1 there is illustrated a conventional ink recording system in which a strip chart 10 is drawn across a platen 12 by a take-up reel 14 driven in the clockwise direction by a motor 16 through a suitable mechanical linkage illustrated by the dotted line 18. Although a strip chart recorder is illustrated, it is to be understood that a circular chart or X–Y recorder could be employed as well.

Ink having a relatively low viscosity, typically below 100 centipoises, is stored in an ink reservoir 20 of suitable construction. A flexible conduit 22 supplies ink either by capillary or gravity feed (or the ink in the reservoir may be maintained under pressure) through a flexible conduit or tube 22 to a conventional ink pen 24. The nib or tip of pen 24 engages the surface of the chart paper 10 so as to make a visible trace 26 thereon. The pen 24 is connected by a suitable mechanical linkage 28 to be driven transversely to the direction of paper motion by a galvanometer denoted by the coil 30.

An input signal to be recorded is applied at the input terminals 32 which are connected to the input of a galvanometer drive amplifier 34. The output of the galvanometer drive amplifier 34 may be connected across the drive coil 30 of the galvanometer. The galvanometer driving arrangement and the pen are denoted by way of illustration only. Any suitable pen and pen drive system may be employed as desired. One suitable system is described, by way of example, in U.S. Patent No. 3,088,788 issued May 7, 1963 to A. D. Brown, Jr., et al. Brown Jr., et al. describe a pen providing a rectilinear trace, i.e., one in which the stylus nib records straight-line traces extending perpendicularly to the length of the record. Also Brown, Jr., et al., describe a galvanometer drive amplifier driving a galvanometer drive coil. Signals derived from a velocity coil and a pen position sensor in the galvanometer are fed back to the input of the drive amplifier to improve the accuracy and response of the servosystem.

In accordance with the invention, the drive coil 30 is connected in parallel with a series connected resistor 52 one winding 50 of an electromechanical or solenoid actuator 51. The remaining or second winding 54 of the solenoid actuator is serially connected between the first winding 50 and ground. The time constant of the second winding 54 of the solenoid is selected to be equal to or less than that of the galvanometer drive coil 30 (including, of course, the inductive effect of the magnetic circuit of the galvanometer). The second winding 54 functions as the pull-in winding for the actuator 51 and permits the solenoid actuator 51 to respond to input signals having rapid rise or fall times. The first winding 50 of the solenoid actuator 51 is selected to have a time constant equal to or greater than that of the galvanometer drive coil 30 and functions as a hold winding. In effect the first winding 50 provides a mechanical signal (in the form of motion of the actuator) that is proportional to the integrated value of the input signal. This renders the solenoid actuator 51 somewhat insensitive to rapid, successive changes in acceleration of the pen 24 so that the conduit 22 remains closed and a continuous pressure can be maintained on the ink as will be described hereinafter.

Further, in accordance with this invention, the solenoid actuator 51 is coupled through a suitable mechanical linkage 56 to the actuating member 58 of a valving-pump 60. The valving-pump 60 is interposed in the conduit 22 between the ink reservoir 20 and the ink pen 24. In the form illustrated, the valving-pump may comprise a compressible resilient section in said conduit in the form of a tube 62 of rubber or other flexible material, placed over the adjoining ends 64 of the conduits 22 so as to provide a small cylindrical chamber 66 of variable volume. The actuating member 58 when activated by the solenoid actuator 51 squeezes the rubber tube 62 against a suitable support member 68 thereby sealing or completely closing at least one end of the chamber 66 to prevent the passage of ink away from the pen tip. Otherwise, ink back pressure due to the rapid accelerations and decelerations of the pen, as are particularly pronounced in rectilinear pen drive systems with input signals having high rise or fall times, would cause skipping.

The actuating member 58 preferably is formed so as to have a protuberance 70 positioned at the ink reservoir end of the chamber 66. In this manner, as the rubber tube 62 is squeezed, the ink supply end of the chamber 66 seals off sooner than the out-flow end. As the squeezing continues, the pressure of the ink in the system between the valving-pump 60 and the ink pen 24 increases and aids in providing an ink trace that is relatively uniform in width even with high pen velocities. This pressure is maintained for a period of time sufficient for the pen velocity to return substantially to zero or a low value not requiring increased ink pressure because of the unique integrating action of the two coil solenoid actuator 51 described hereinbefore. The rapid release of ink pressure facilitated by the solenoid actuator 51 prevents flooding of the ink.

In many systems the additional pressure modulation may not be necessary, it being entirely satisfactory merely to close the ink conduit to prevent the back flow of ink when the pen 24 is accelerating. In other systems only a small variation in ink pressure is necessary after the ink supply tube is closed. The particular system selected is a function of the particular recorder, pen, and system response to input signals. It is preferable that the location of the valving-pump 60 be as close to the pen 24 as possible without increasing the weight or inertia of the pen or its driving system.

In FIG. 2 there is illustrated an alternative embodiment of this invention that may be employed for the valving-pump 60. In this instance, the valving-pump 60 includes a base member 80 which may be machined from suitable stainless steel rectangular bar stock. A shallow cylindrical depression 82 is formed in one face of the base member 80 and a conduit 84 is drilled from one side of the base member 80 to the center of the depressed area 82. A second conduit 86 is formed in the base member 80 to communicate between another side of the block and a peripheral portion of the depression 82. A resilient membrane 88, formed of rubber or other resilient material and held in position by a retaining ring 90, covers the depressed area 82 so as to form a chamber of small volume.

A plunger 92, which may be formed of a urethane plastic or other resilient and flexible material, having a rounded tip is connected by the linkage 56 and positioned to depress the center of the rubber membrane 88. As the center of the membrane 88 is depressed by the plunger 92 in response to an input signal of either polarity appearing at the terminals 32 which causes the pen to accelerate, the plunger 92 first closes the conduit 84, which is connected to the ink reservoir 20. With continued motion of the plunger 92 in a downward direction in the drawing, the plunger now de-forms and reduces the volume of the chamber formed by the membrane 88 and the depressed area 82 so as to increase the pressure of the remaining ink in the chamber thereby to supply ink to the pen tip and thereby accommodate higher pen velocities.

Still other valving-pumps may be used as desired. For example, the valving-pump may consist of a check valve and a pump, such that when the pump increases the pressure of the ink available to the pen, the check valve closes to prevent ink flow back to the reservoir. Whatever the pump used, it should have small volume, rapid response time, and the ability to quickly and initially shut off fluid or ink flow from the pen. If desired the integrating function performed by the hold coil 54 in the solenoid actuator may be accomplished electronically by well-known techniques, however, the solenoid is preferred due to its simplicity, low cost, and rapid response time.

There has thus been described an improved recording system which provides an adequate ink supply to the pen tip of a high-speed ink recorder without causing flooding even under relatively adverse conditions including input signals having relatively high rise and fall times.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:

1. In a recording system of the type having a record chart and an ink pen associated therewith for providing a visible trace on said chart at a relative position on said chart as determined by an input signal, the combination of:
   input terminals for receiving said input signals to be recorded,
   driving means connected to said input terminals and to said ink pen for positioning said pen relative to said chart in accordance with said input signal,
   ink reservoir means for storing a supply of ink at a predetermined pressure,
   a conduit connecting said ink reservoir means to said ink pen, and
   valve means interposed in said conduit between said ink reservoir and said ink pen for substantially closing said conduit when the acceleration of said pen relative to said paper exceeds a predetermined value.

2. The combination set forth in claim 1 which also includes pressure modulating means interposed in said conduit between said valve means and said ink pen for increasing the pressure of the ink in said conduit above said predetermined pressure as a function of the velocity of said ink pen relative to said record chart.

3. The combination set forth in claim 2 wherein:
   said driving means also includes a galvanometer drive coil, and
   said pressure modulating means includes a solenoid having first and second windings connected in series across said input terminals, said galvanometer drive coil being connected in parallel with said first winding.

4. The combination set forth in claim 3 wherein said first winding has a time constant equal to or greater than that of said galvanometer drive coil and said second winding has a time constant equal to or less than said galvanometer drive coil.

5. The combination set forth in claim 1 wherein said valve means includes means for maintaining the closure of said conduit substantially as a function of the velocity of said pen relative to said record chart.

6. In a recording system of the type having a record chart and an ink pen associated therewith for providing a visible trace on said chart at a relative position on said chart as determined by an input signal, the combination of:
- input terminals for receiving said input signal to be recorded,
- driving means connected to said input terminals and to said ink pen for positioning said pen relative to said chart in accordance with said input signal,
- ink resecroir means for storing a supply of ink at a predetermined pressure,
- a conduit connecting said ink reservoir means to said ink pen, and
- valving-pump means comprising a normally open valve interposed in said conduit between said ink reservoir means and said ink pen, said valve being closed in response to an activating signal,
- actuating means responsive to said input signal for providing an actuating signal to close said valve.

7. The combination set forth in claim 6 wherein said valving-pump means comprises:
- check valve means for permitting fluid flow only from said reservoir means to said pen, and
- pump means responsive to said actuating means for increasing the pressure of the ink above said predetermined pressure in said conduit between said check valve means and said pen.

8. The combination set forth in claim 7 wherein said actuating means comprises:
- differentiating means responsive to said input signal for operating said pump means, and
- integrating means responsive to said input signal for maintaining said pump means operated thereby to maintain the increased pressure of said ink as a function of pen velocity.

9. The combination set forth in claim 6 wherein said valving pump means includes pressure modulation means for increasing the pressure of the ink in said conduit above said predetermined pressure as a function of the velocity of said ink pen relative to said record chart.

10. The combination set forth in claim 9 wherein:
- said driving means includes a galvanometer drive coil, and
- said actuating means includes a solenoid having first and second windings connected in series across said input terminals, said galvanometer drive coil being connected in parallel with said first winding.

11. The combination set forth in claim 10 wherein said first winding has a time constant equal to or greater than that of said galvanometer drive coil and said second winding has a time constant equal to or less than said galvanometer drive coil.

12. In a recording system of the type having a record chart and an ink pen associated therewith for providing a visible trace on said chart at a relative position on said chart as determined by an input signal, the combination of:
- input terminals for receiving said input signals to be recorded,
- driving means connected to said input terminals and to said ink pen for positioning said pen relative to said chart in accordance with said input signal,
- ink reservoir means for storing a supply of ink at a predetermined pressure,
- a conduit continuously connecting said ink reservoir means to said ink pen, and
- pressure modulating means interposed in said conduit between said ink reservoir and said ink pen for increasing the pressure of the ink in said conduit above said predetermined pressure as a function of the velocity of said ink pen relative to said record chart.

13. The combination set forth in claim 12 wherein said driving means includes a galvanometer drive coil, and said pressure modulating means includes a solenoid having first and second windings connected in series across said input terminals, said galvanometer drive coil being connected in parallel with said first winding.

14. The combination set forth in claim 12 wherein said first winding has a time constant equal to or greater than that of said galvanometer drive coil and said second winding has a time constant equal to or less than said galvanometer drive coil.

References Cited

UNITED STATES PATENTS

| | | | |
|---|---|---|---|
| 3,054,109 | 9/1962 | Brown | 346—140 X |
| 3,169,821 | 2/1965 | Miller | 346—140 |
| 3,185,991 | 5/1965 | Gill et al. | 346—140 |
| 3,266,048 | 8/1966 | Schweitzer | 346—140 |

FOREIGN PATENTS

| | | |
|---|---|---|
| 753,407 | 8/1933 | France. |

RICHARD B. WILKINSON, *Primary Examiner.*

J. W. HARTARY, *Assistant Examiner.*